United States Patent [19] | [11] 4,161,012
Cunningham | [45] Jul. 10, 1979

[54] HIGH VOLTAGE PROTECTION APPARATUS

[75] Inventor: Francis V. Cunningham, Western Springs, Ill.

[73] Assignee: Joslyn Mfg. and Supply Co., Chicago, Ill.

[21] Appl. No.: 773,511

[22] Filed: Mar. 2, 1977

[51] Int. Cl.[2] .................... H02H 3/22

[52] U.S. Cl. .................... 361/128; 174/71 R; 174/71 C; 361/127; 339/111

[58] Field of Search .................... 29/25.1, 450, 451; 174/71 R, 71 C, 72 R; 338/21; 339/111, 60 R, 60 C, 61 R, 59 R, 97 R; 361/127, 128, 130, 131, 135, 137, 117, 125, 126, 132

[56] References Cited

U.S. PATENT DOCUMENTS

| | | | |
|---|---|---|---|
| 2,860,210 | 11/1958 | Stoelting et al. | 361/125 X |
| 3,461,419 | 8/1969 | Cink | 174/71 C X |
| 3,631,323 | 12/1971 | Pittman | 361/127 X |
| 3,727,108 | 4/1973 | Westrom | 361/127 |
| 3,806,765 | 4/1974 | Matsuoka et al. | 361/128 |
| 3,835,439 | 9/1974 | Yonkers | 339/111 X |

*Primary Examiner*—Patrick R. Salce
*Attorney, Agent, or Firm*—Mason, Kolehmainen, Rathburn & Wyss

[57] ABSTRACT

Arresters for protecting electrical equipment from damage or destruction due to overvoltage surges, for example overvoltage surges caused by lightning strokes, are provided that are fabricated or assembled integrally with cable taps, cable joints, separable insulated connector apparatus, and overhead arrester assemblies. Arresters are also provided for insertion in arrester receptacles which are integrally provided with cable taps, joints, separable insulated connector apparatus or cable receptacle devices. The arresters include a laminated enclosure for excluding the atmosphere, air and moisture, along the outer surfaces of arrester components and along the outer surface of an insulating housing layer, as well as along interfaces with insulated power cable and separable insulated arrester components. The housing is either fabricated by coating or molding onto the arrester components or by inserting the arrester components in an interference fit relationship into a premolded elastomeric enclosure.

57 Claims, 11 Drawing Figures

Fig. 1
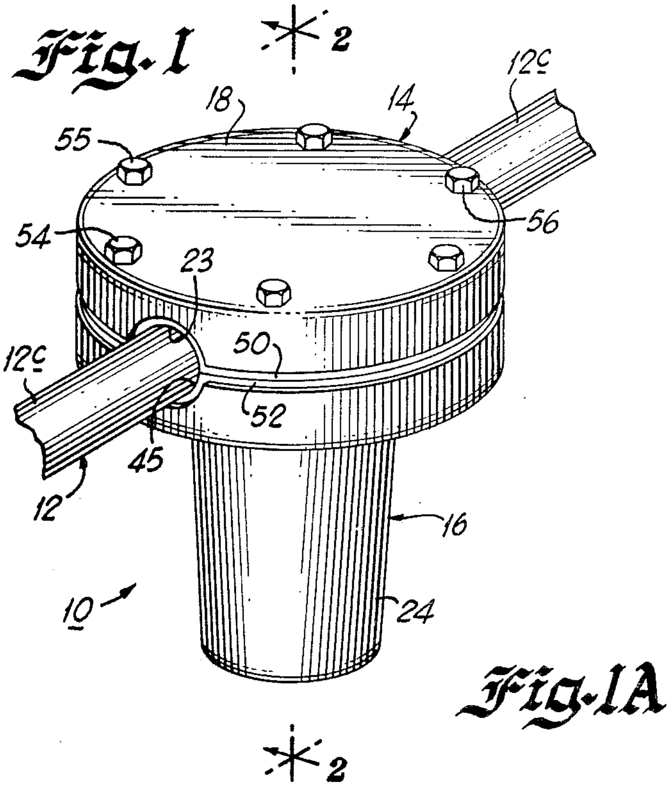
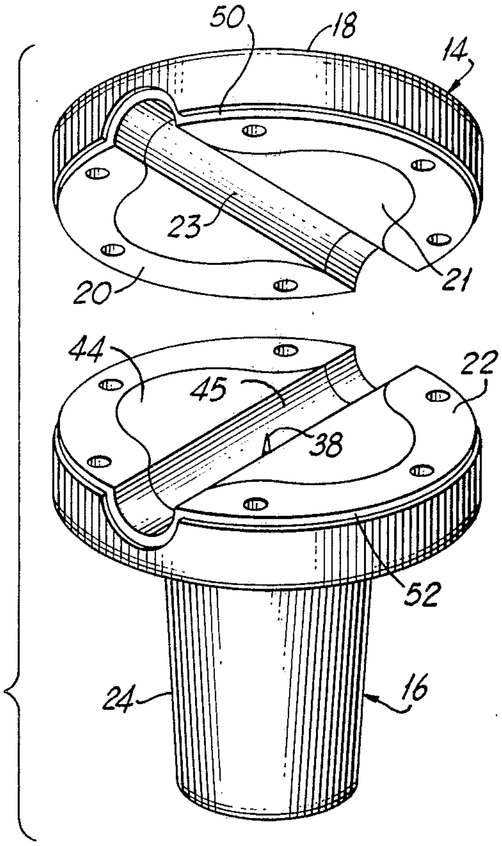
Fig. 1A
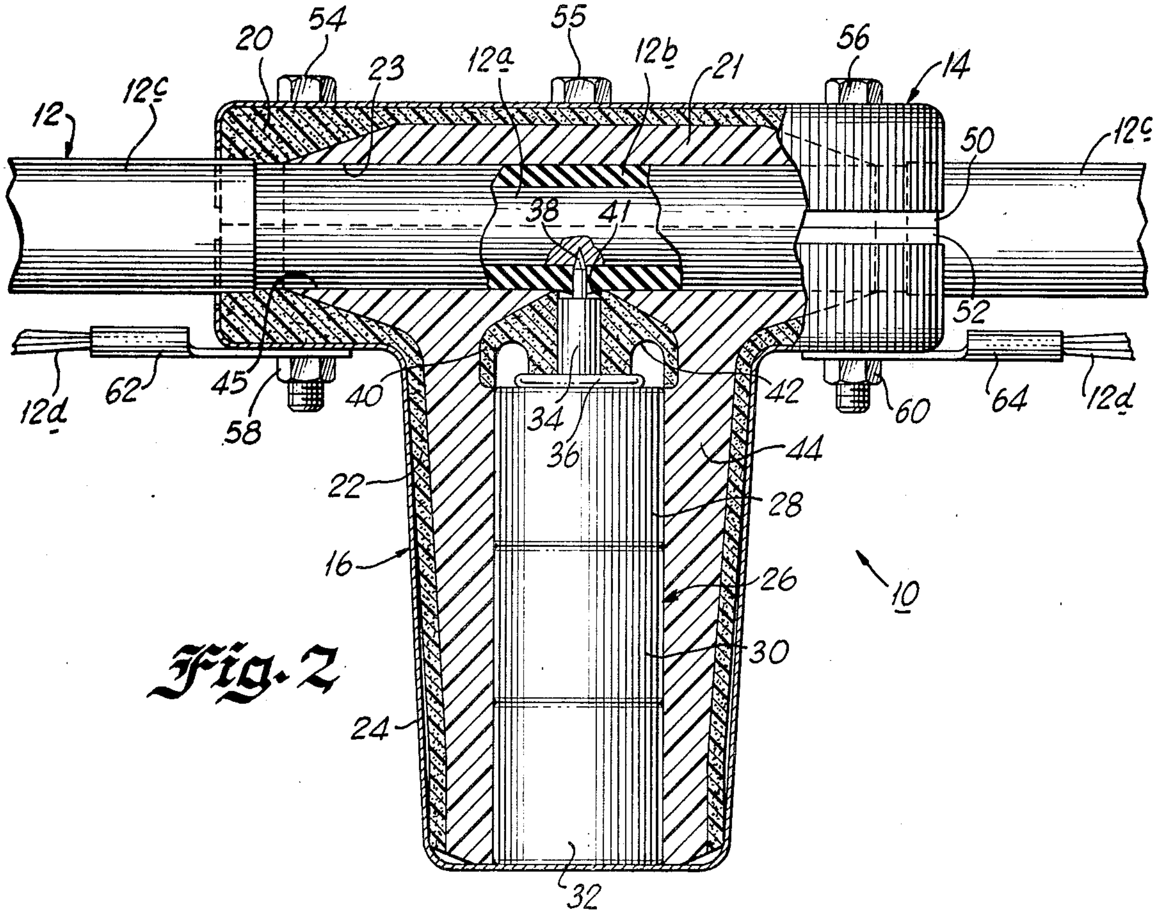
Fig. 2

Fig. 10
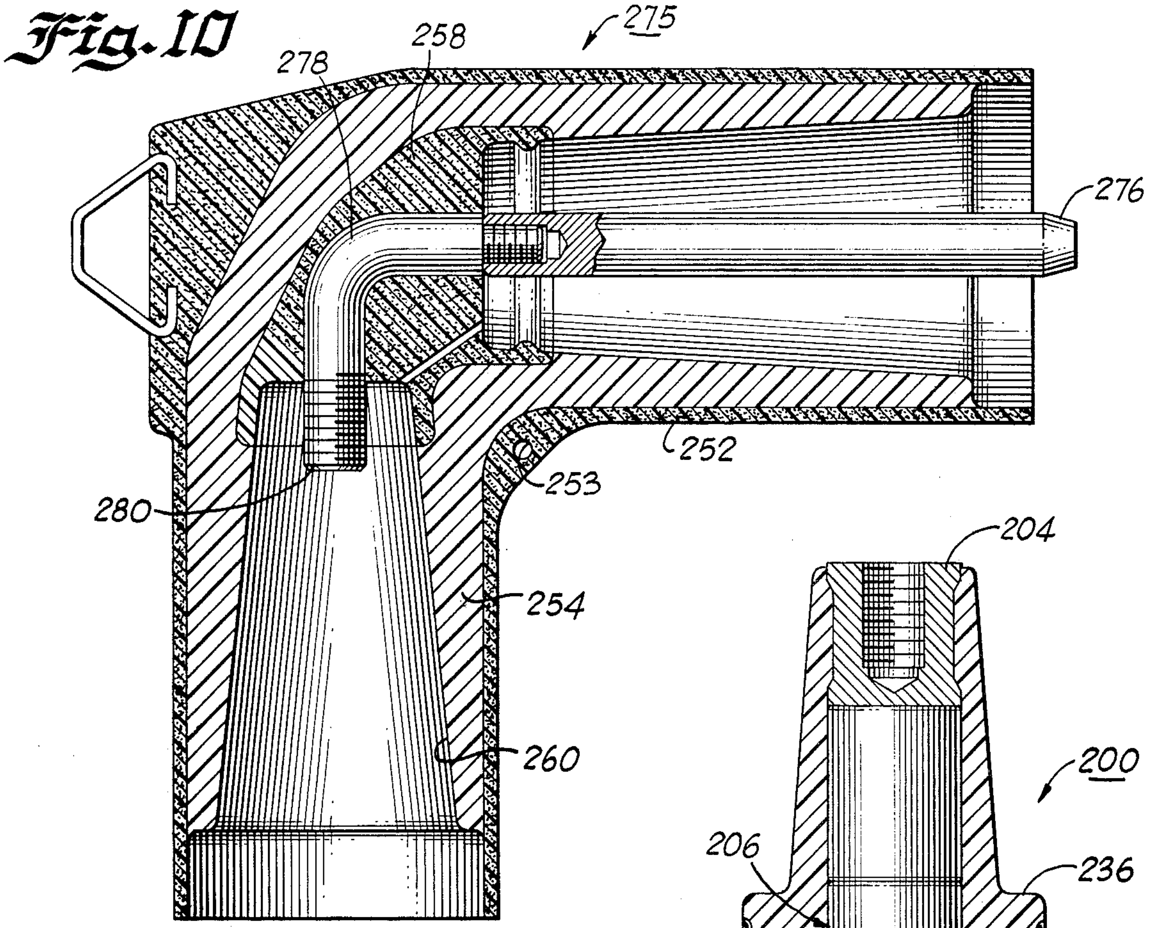
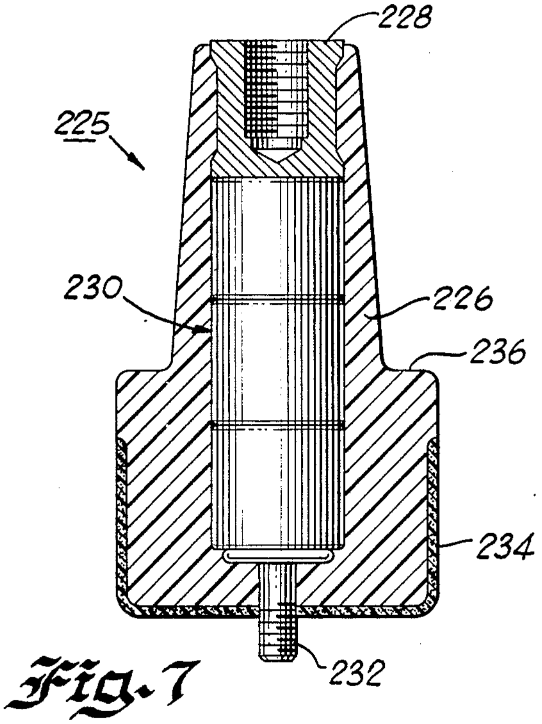
Fig. 7
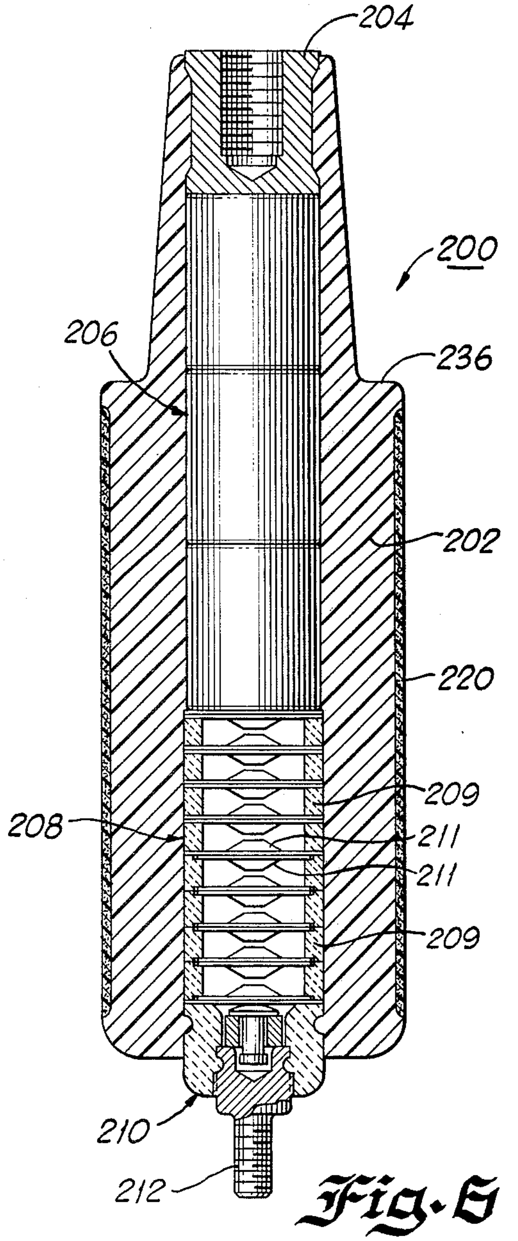
Fig. 6

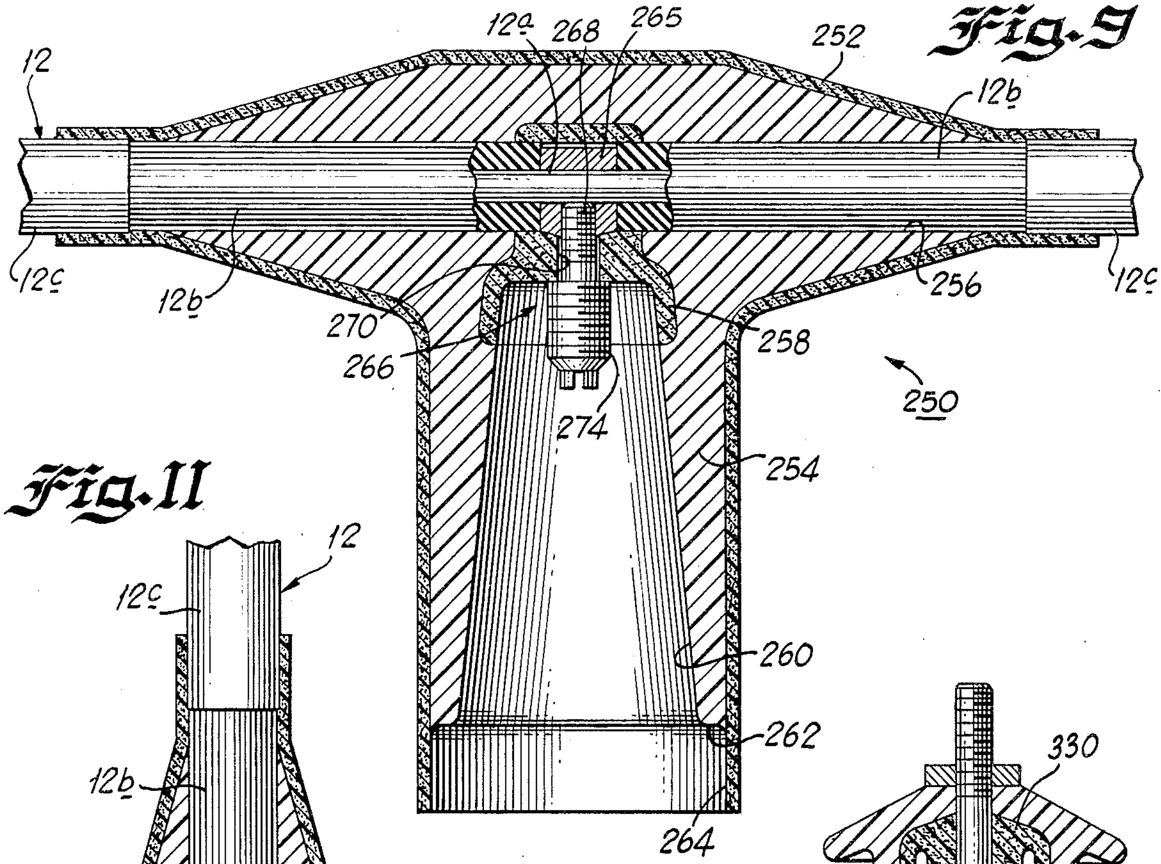
Fig. 9
Fig. 11
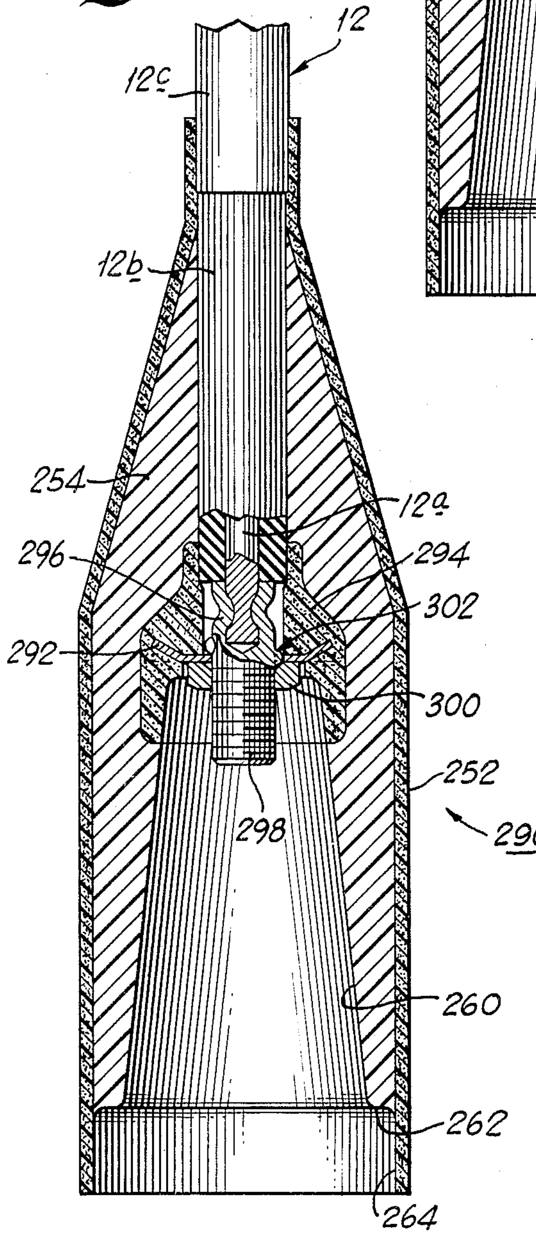
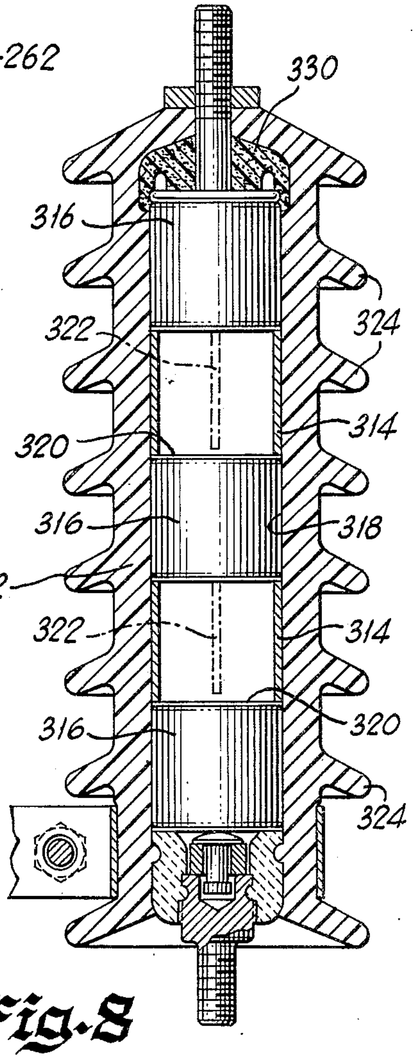
Fig. 8

HIGH VOLTAGE PROTECTION APPARATUS

BACKGROUND OF THE INVENTION

A. Field of the Invention

The device of the present invention generally relates to apparatus for protecting electrical equipment from damage or destruction due to the presence of electrical overvoltage surges, commonly referred to as surge arresters.

B. Description of the Prior Art

A surge arrester is commonly electrically connected across a comparatively expensive piece of electrical equipment to shunt overvoltage surges, for example overvoltage surges due to lightning strokes, to ground to thereby protect the piece of electrical equipment from damage or destruction due to the overvoltage surges.

Such surge arresters include arrester components disposed within an arrester enclosure. The arrester enclosure for an overhead arrester for use in outdoor, contaminated conditions is an insulating housing while the enclosure for a submersible arrester further includes an outer conductive layer or jacket. The arrester components include an arrester element, a connector for connection to a system voltage and a ground connector for connection to a ground potential, and may include a disconnector, A disconnector rapidly extinquishes an electrical arc and/or disconnects the ground lead upon failure of the arrester, as well known in the art. The arrester element includes a valve element and may include a gap element. The valve element has one or more valve blocks each formed of a negative resistance material, silicon carbide and a ceramic binder for example. The gap element has one or more spark gaps typically formed by pairs of opposed conductive gap electrodes separated by gap spacers. For example, a prior art surge arrester is illustrated in U.S. Pat. Nos. 3,727,108 and 3,869,650. For a detailed description of arrester structure and operation, reference may be made to U.S. Pat. No. 3,869,650 which is hereby incorporated by reference herein for all purposes.

Other types of surge arresters utilize a valve element formed as metal oxide varistors and herein termed MOV valve blocks. These arresters do not usually include a gap element in the arrester element. Examples of this type of surge arrester are illustrated in U.S. Pat. Nos. 3,805,114; 3,806,765; and 3,811,103 to which reference may be made for a detailed discussion and which are hereby incorporated by reference herein for all purposes.

As illustrated in the aforementioned patents, prior art surge arresters include a separation between the internal surface of the insulating housing and the outer surfaces of the arrester element; that is, the gap element and/or the valve element.

It is known in the prior art that voltage stresses are present across the separation referred to above which can result in damage or destruction to the elements of the prior art surge arresters. The prior art has attempted to alleviate the voltage stress across the above-mentioned separation by surrounding the separation with an equal potential field. For example, one approach to the problem is the provision of stress relief elements such as the voltage stress relief elements 21 and 24 embedded within the elastomeric housing 1 disclosed in the above-mentioned U.S. Pat. No. 3,727,108.

Prior attempts to eliminate the voltage across such separations normally require a rather complex and expensive construction. In addition, such construction as illustrated in the above-mentioned U.S. Pat. No. 3,727,108 are further complicated when used with the MOV valve blocks illustrated in the above prior art patents.

SUMMARY OF THE INVENTION

An object of the present invention is to provide a new and improved apparatus for protecting electrical equipment from damage or destruction due to electrical overvoltage surges.

Another object of the present invention is to provide a new and improved surge arrester.

Another object of the present invention is to provide a new and improved surge arrester for separable insulated connection to an electrical apparatus.

Another object of the present invention is to provide a new and improved surge arrester for direct connection to an insulated high voltage power cable.

Another object of the present invention is to provide a new and improved overhead surge arrester for use in outdoor, contaminated conditions.

Another object of the present invention is to provide new and improved arrangements for connecting surge arresters to standard separable insulated connector apparatus bushings or directly to high voltage insulated power cables.

Another object of the present invention is to provide new and improved surge arresters having a housing and internally disposed arrester components wherein an atmosphere excluding interface is provided between the inner surface of the housing and the outer surfaces of the internally disposed components.

Another object of the present invention is to provide new and improved surge arrester enclosures for excluding air and moisture from outer surfaces of internally disposed arrester components and from surfaces integrally formed for interfacing with submersible electrical system components.

Briefly, the device of the present invention comprises a surge arrester for protecting electrical equipment from damage or destruction due to overvoltage surges, for example overvoltage surges caused by lightning strokes. The arresters are fabricated or assembled integrally with cable taps, cable joints, separable connector apparatus, and overhead arrester assemblies. Arresters are also provided for insertion in arrester receptacles which are integrally provided with cable taps, separable connector apparatus, or cable enclosure devices.

BRIEF DESCRIPTION OF THE DRAWINGS

The above and other objects and advantages and novel features of the present invention will become apparent from the following detailed description of several embodiments of the invention illustrated in the accompanying drawings, wherein:

FIG. 1 is a perspective view of an arrester integrally provided with a cable tap and constructed in accordance with the principles of the present invention;

FIG. 1A is an exploded perspective view of the arrester of FIG. 1 before the cable is in position;

FIG. 2 is a partially-elevational and partially-cross sectional view of the arrester of FIG. 1 with portions of the arrester and the cable broken away;

FIG. 6 is a cross-sectional view of an arrester having an arrester element including a valve element and a gap element and constructed in accordance with the principles of the present invention;

FIG. 7 is a cross-sectional view of an arrester having an arrester element including a valve element formed from MOV valve blocks and constructed in accordance with the principles of the present invention;

FIG. 8 is a cross-sectional view of an overhead arrester constructed in accordance with the principles of the present invention;

FIG. 9 is a cross-sectional view of an arrester receptacle integrally provided with a cable tap and accepting the arresters of FIGS. 6 and 7 and constructed in accordance with the principles of the present invention;

FIG. 10 is an arrester receptacle integrally provided with a bushing receptacle and accepting the arresters of FIGS. 6 and 7 and constructed in accordance with the principles of the present invention; and FIG. 11 is a partially-elevational and partially-cross sectional view of an arrester receptacle integrally provided with a cable enclosure and accepting the arresters of FIGS. 6 and 7 and constructed in accordance with the principles of the present invention.

DESCRIPTION OF THE PREFERRED EMBODIMENT

Figure 5:
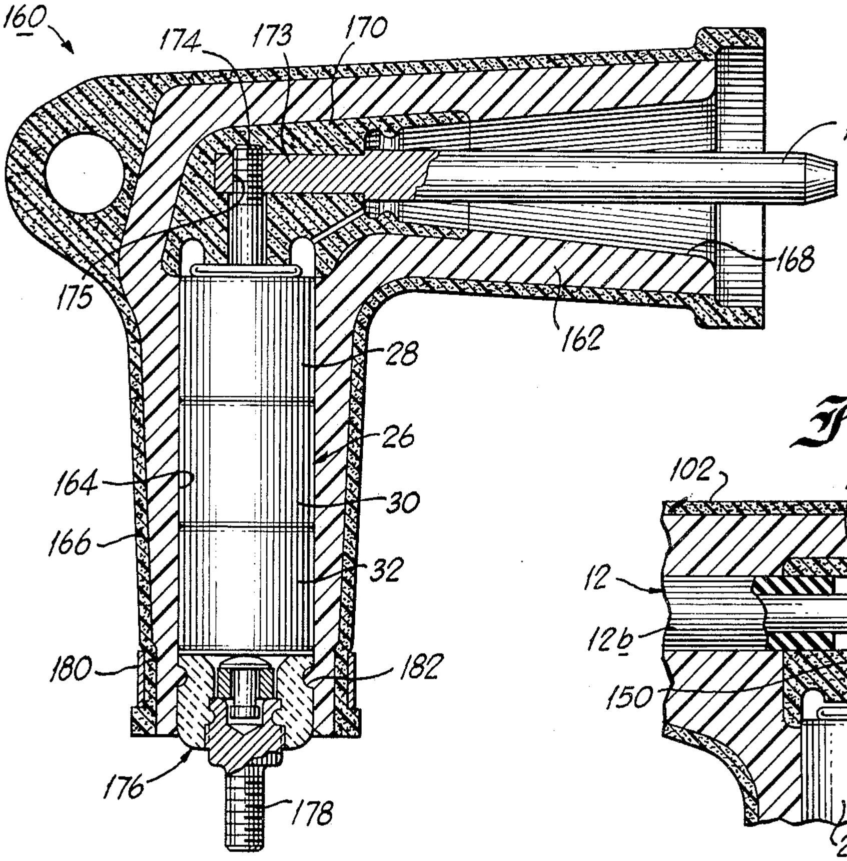
FIG. 5 is a partially-elevational and partially-cross sectional view of an arrester integrally provided with a bushing receptacle and constructed in accordance with the principles of the present invention.

Referring to the drawings and initially to FIGS. 1 through 8, there are illustrated new and improved surge arresters constructed in accordance with the principles of the present invention.

The arresters of FIGS. 1 through 8 are provided to protect comparatively expensive electrical equipment from damage or destruction due to electrical overvoltage surges such as those caused by lightning strokes by providing an electrical path to ground potential for the overvoltage surges.

In accordance with important aspects of the present invention, the arresters of FIGS. 1 through 7 are assembled to exclude the atmosphere, air and moisture, from all interfaces, with and within a formed insulating housing, existing between the arrester components and an external conductive layer, thereby precluding corona effects and aiding heat conduction. The air and moisture exclusion may be accomplished by either integrally forming the housing around the arrester components or by assembling the arrester components into premolded housings. The premolded housings may be fabricated from insulating dilatable or elastomeric materials with the bore diameter of the housing molded smaller than the arrester components to be inserted. The arrester components, precoated to form smooth outer surfaces in a specific embodiment, are lubricated and inserted into the housing arrester bore in an interference fit relationship by dilating or deforming the housing material. In this manner, all ionizable air or gas from the component to housing interface will be expelled, resulting in an air free (atmospher-free) interfacial relationship. The air-free interface need not be perfectly smooth to prevent formation of corona. In practice, the arrester element may include minor dimensional irregularities, including small chips for example, which may arise at the outer surfaces near the contact surfaces of the valve blocks and/or gap spacers. The contact surfaces are those surfaces of valve blocks, gap electrodes and gap spacers that contact each other when the arrester element is assembled. The outer or peripheral surfaces are generally those at an interface with the inside surface of the housing.

The arresters also include integrally formed means for providing air free and moisture free sealed and voltage graded interfaces with components of submersible shielded electrical systems.

Briefly, in arresters that include a gap element and silicon carbide valve blocks, most of the applied system voltage appears across the gap element and the voltage is controlled and distributed along the gap-to-housing interface in accordance with the electrical impedance, that is, the capacitance or resistance of the gap element. Only a small portion of the applied voltage appears across the silicon carbide valve blocks and across a disconnector that may be provided. The gap element typically includes gas electrodes and gap spacers. The gap spacers maintain the electrode spacing to control arrester sparkover. In arresters that include MOV valve blocks and no gap element, the diameter and electrical characteristics of the MOV valve blocks control voltage distribution and dielectric stress along the valve block-to-housing interface.

In accordance with important aspects of the present invention, the spacers provided in the gap element of the arrester include outer surfaces for forming air and moisture free interfacial contact with insulating housing materials. The spacers grade the voltage and control the dielectric stress along the spacer to housing interface. When the spacers are fabricated from a material such as a ceramic having a specific inductive capacitance greater than five, the spacers function as capacitive type voltage dividers. When the spacers are fabricated from material including carbon or silicon carbide additives, the spacers may function as resistance type voltage dividers. When space allows, separate capacitors or resistors may also be provided within spacers formed of insulating material.

In an arrester of the present invention that utilizes only MOV valve blocks and no gap element, the MOV valve blocks grade the voltage and provide control of the dielectric voltage stress along the enclosure interface. Under normal system AC operating voltage, the metal oxide valve blocks may serve as a capacitance voltage divider, while under transient overvoltage conditions, the MOV valve blocks serve both as surge diverters and as resistance voltage dividers.

The arresters of FIGS. 1 through 4 constructed in accordance with the principles of the present invention are illustrated as integrally provided with cable taps and cable joints. The arrester of FIG. 5 is illustrated as integrally provided with a separable bushing receptacle. The arresters of FIGS. 6 and 7 are integrally molded and capable of being inserted into and retained by (1) a separable splice connected as illustrated in FIG. 1 of U.S. Pat. No. 3,980,374, (2) the arrester receptacles illustrated in FIGS. 9 through 11 and constructed in accordance with the principles of the present invention, or (3) other suitable arrester receptacles.

The arrester receptacle of FIG. 9 is fabricated integrally with a cable tap for connection to an insulated power cable while the arrester receptacle of FIG. 10 is fabricated integrally with a bushing receptacle. The arrester receptacle of FIG. 11 is fabricated integrally with a cable enclosure. The material utilized in fabricating the devices of FIGS. 1 through 5 and 9 through 11 is an elastomeric material, for example, ethylene propylene polymer, approximately Shore A 60. 60.

The arresters of FIGS. 1 through 5 are of a high voltage submersible arrester type suitable for attachment to a cable or to separable connector components of submersible apparatus. The arresters of FIGS. 6 and 7 are suitable for insertion into the arrester receptacles of FIGS. 9, 10 and 11. Further, the arrester of FIGS. 6 and 7 are suitable for insertion into the separable splice connector of the aforementioned U.S. Pat. No. 3,980,374. The arrester of FIG. 8 is an overhead arrester for outdoor, contaminated conditions. The arresters of the present invention as described in connection with FIGS. 1 through 11 may include various disconnector or other failure indicating devices.

Referring now to FIGS. 1, 1A and 2, the arrester with integral cable tap referred to generally at 10 is shown, FIGS. 1 and 2, in the assembled field position about an insulated power cable 12 which includes a center cable conductor 12*a*, which may be stranded, surrounded by an insulating portion or layer 12*b*. The high voltage power cable 12 also includes a conductive sheath layer 12*c* and may include concentric neutral wires 12*d*.

The arrester 10 includes a top portion 14 and a bottom portion 16 which are assembled about a cable 12 at the desired point of connection or attachment wherein the insulated power cable 12 has been properly prepared over a predetermined length by the removal of the conductive sheath layer 12*c* and the concentric neutral wires 12*d*.

The top portion 14 includes a supportive cylindrical conductive cover 18 and a first layer 20 of a conductive elastomeric material in contact with the cover 18 and a central insulating elastomeric housing 21 having a semicircular cable passageway 23. The top portion 14 and the insulating housing 21 are dimensioned to interfit over the cable 12 and with the lower portion 16 which similarly includes a conductive elastomeric layer 22 within a conductive metallic cover 24.

Completely enclosed within the lower portion 16 is an arrester element referred to generally at 26 which includes a predetermined number of metal oxide varistor MOV valve blocks 28, 30 and 32 for an arrester with a 9 to 10 KV rating disposed in a stacked relationship. The lower valve block 32 contacts the conductive cover 24 and the upper block 28 contacts a cable connector 34 through a circular conductive base flange 36 of the cable connector 34.

The plurality of blocks 26 are enclosed within a laminated enclosure including an insulating housing 44 of an elastomeric material forming an air-free interfacial contact with the outer surfaces of the blocks. The housing 44 includes a semicircular cable passageway 45.

The cable connector 34 includes a protruding sharpened tip 38 mounted on the blocks 26 and extending a predetermined distance above .the insulating elastomeric housing 44. A conductive shield 40 having a central bore 41 is positioned over the cable connector 34 and is formed of a similar conductive elastomer as the layer 22. The conductive shield 40 includes an annular void 42 in communication with the outer circumference of the flange 36 and the edge of the upper block 28 to provide a mechanical stress relief function in this area to assure that the bond between the shield 40 and the housing 44 is not broken. The insulating elastomeric housings 21 and 44 extend beyond the respective covers 18 and 24 to interfit when assembled to form a hermetic seal around the cable 12. The tapered form of the housings 21, 44 and the conductive layers 20, 22 provide voltage stress relief for the contacted cable insulation 12*b*.

In the assembly of the arrester 10, the top and bottom portions 14 and 16 are interfitted around the prepared length of the cable 12 so that the respective mating interfacing surfaces 50 and 52 of the top and bottom housings hermetically seal and electrically shield the cable while the conductive elastomeric layers 20 and 22 contact the conductive sheath layer 12*c*. Suitable fasteners, for example, bolts 54, 55 and 56 are positioned through respective holes in the top portion 14 and down through aligned holes in the bottom portion 16 with nuts 58, 59 and 60 being threaded onto the bolts 54, 55 and 56 respectively. Spade lug connectors 62 and 64 interconnect the cable concentric neutral wires 12*d* which may be provided with the cable. The space lug connectors 62 and 64 are positioned under the bolt heads or under the nuts 58, 60 to form a ground connection to the arrester 10. The arrester 10 may also be additionally grounded by a suitable ground clamp fastened around the bottom of the portion 16.

Thus upon partial assembly of the portions 14 and 16, the covers 18 and 24 are grounded before connection to the center conductor 12*a* of the cable 12, ensuring safety during the completion of the installation in the event that the cable is energized. The installation proceeds by the tightening of the bolts 54, 55 and 56 which draws or forces the sharp contact point 38 through the layer of cable insulation 12*b* and physically into the center conductor 12*a* forming an electrical contact.

As discussed hereinbefore, the insulating elastomeric housing 44 may be molded onto the arrester element 26 or alternatively the arrester element 26 may be inserted into the premolded or formed elastomeric housing 44 which is fabricated with a smaller diameter central bore than the diameter of the arrester element 26.

Figure 3:
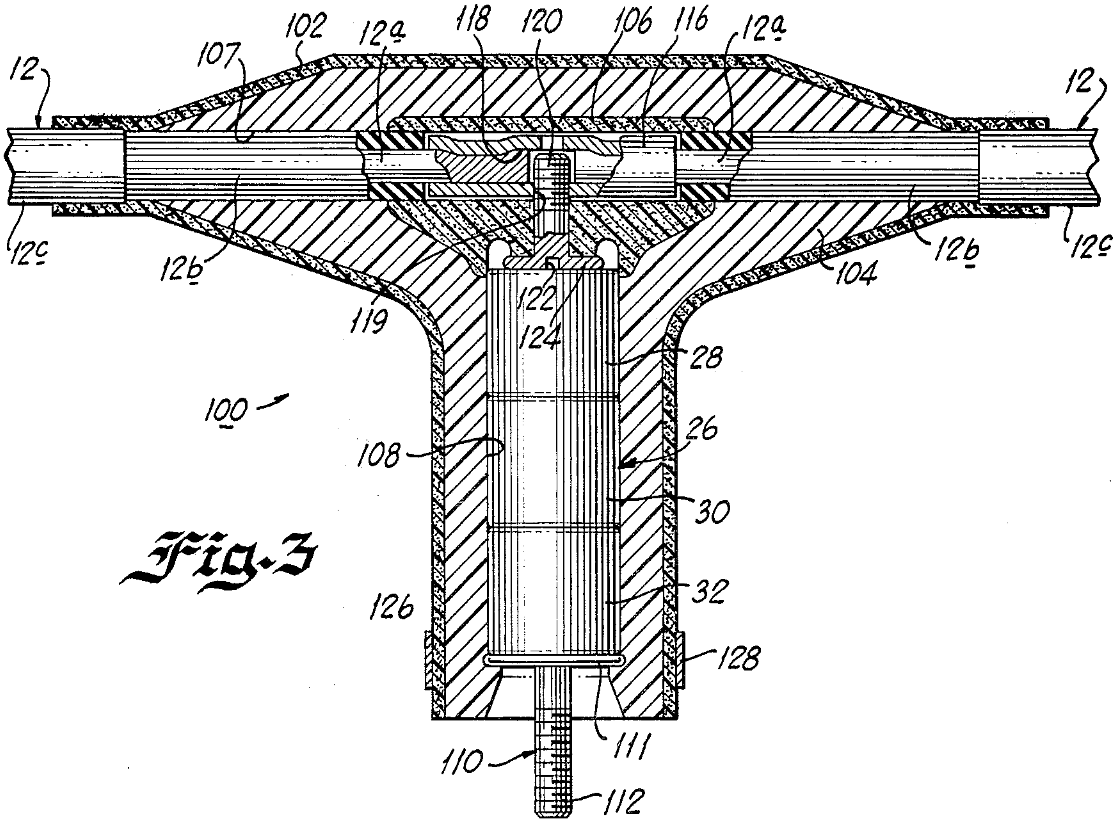
FIG. 3 is a partially-elevational and partially-cross sectional view of an arrester integrally provided with a cable joint and constructed in accordance with the principles of the present invention.

Referring now to FIG. 3, the arrester 100 has a premolded elastomeric laminated enclosure having an outer conductive elastomeric jacket 102 and a generally T-shaped inner insulating elastomeric housing 104 defining a cable passageway 107. The central portion of the arrester 100 includes a conductive elastomeric shield 106 of similar material as that of the conductive elastomeric housing jacket 102 which is formed with a transverse cable passageway and a bore aligned with a central bore 108 of the insulative elastomeric layer 104. The elastomeric insulation 104 is formed or molded so as to define the central bore 108 which extends into the center leg of the T-shaped arrester 100 and into the conductive shield 106. The bore 108 is formed to have a diameter which is somewhat smaller by a predetermined amount than the diameter of the arrester element 26 including the MOV valve blocks 28, 30 and 32 which are similar to those of the arrester 10 of FIGS. 1 and 2.

The plurality of valve blocks 26 in a specific embodiment are precoated around their outer or peripheral surfaces with an insulating compound so as to form smooth outer surfaces but are not so coated along their top and bottom surfaces. The MOV valve blocks 28, 30 and 32, forming the arrester element 26, in a specific embodiment are serially arranged and precoated prior to insertion into the central bore 108. The insulating coating compound may retain the MOV valve blocks 28, 30 and 32 as a single arrester element.

The arrester 100 is assembled in the field by first preparing the cable ends. The cable 12 is prepared by exposing predetermined lengths of the conductor **12*a* and the insulation 12*b*. A conductor connector 116 includes a barrel portion 118 for accepting the conductor ends and may also include suitable center conductor stops determining the length of insertion of the center conductors. The conductor connector 116 also includes a centrally threaded sleeve portion 119 arranged perpendicularly to the barrel portion 118**.

After the cable ends are prepared, the arrester enclosure, that is the arrester 100 without the arrester components, is dilated over one end of the cable and moved along the cable sufficiently to expose the cable end. The two conductor ends are inserted into the barrel portion 118 of the conductor connector 116 and the conductor connector 116 is crimped. The arrester enclosure 100 is then positioned over the cable connection point so as to align the threaded sleeve 119 with the center of the central bore 108, to electrically protect the cable insulation **12*b*,** and to exclude air and moisture from the enclosed cable ends.

A threaded connector stud 120 is then inserted through the central bore 108 and threaded into the sleeve 118 by means of a screwdriver slot 122, for example, provided in a flange 124 of the connector stud 120. A ground connector 110 having a flanged portion 111 and a threaded extending stud 112 is also provided to be arranged below the arrester element 26.

The arrester element 26 may be lubricated before the installer inserts the arrester element 26 and the ground connector 110 into the central bore 108 which, as discussed hereinbefore, is of a smaller diameter than the diameter of the arrester components, the arrester element 26 and the flange 111. To allow air to escape from the central bore 108 during the insertion of the arrester element 26, a small diameter flexible rod is first inserted along the length of the bore 108.

As the arrester element 26 dilates and deforms the central bore 108, air is forced out of the central bore 108 along the rod, with the periphery or outer surfaces of each of the MOV valve blocks in the arrester element 26 forming an atmosphere excluding contact with the bore surface of the insulating material 104. Air along the rod is then ejected as the rod is removed. The arrester element 26 is then forced into a contacting position with the threaded connector stud 120 by the act of stretching the bore 108 until the ground connector 110 snaps over a retaining shoulder 126 formed in the bore 108.

The arrester element 26 and the ground connector 110 are maintained in contact with the flange 124 of the connector stud 120 by the force of the deformed elastomeric material 104. Further, a ground clamping band 128 may be positioned over the bottom of the enclosure 100 to enable grounding of the conductive jacket 102 and to more tightly seal the ground connector 110 and the arrester element 26. Attachment of a suitable ground wire to the ground connector 110 completes the installation thereby providing overvoltage surge protection to the cable 12.

Figure 4:
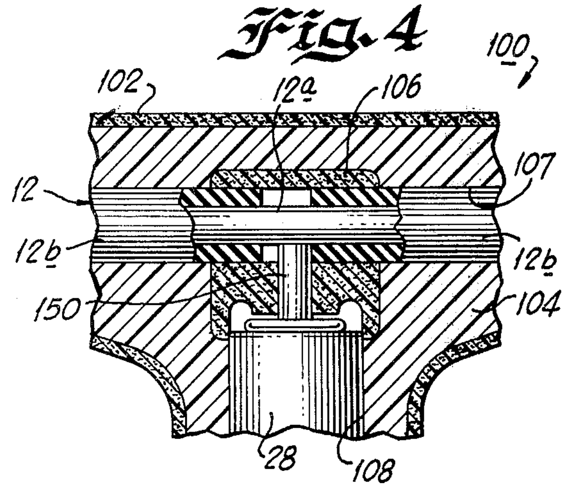
FIG. 4 is a partial cross-sectional view of an arrester integrally provided with a cable tap and constructed in accordance with the principles of the present invention.

Referring now to FIG. 4, the arrester 100 may also be provided with a connector stud 150 which is similar to the connector 120 of FIG. 3 but which is not threaded into a crimp connector assembly. The cable 12 is connected to the connector stud 150 directly by means of forcing the connector stud 150 into contact with the center conductor **12*a* without cutting the center conductor 12*a*.**

To assemble the arrester 100 of FIG. 4, the cable 12 is first prepared by exposing predetermined lengths of the conductor **12*a* and the insulation 12*b*.**

The arrester 100 is then dilated over a proximate end of the cable 12 and forced along the cable until in position over the exposed portion of the center conductor **12*a* and in alignment with the central bore 108. The arrester element 26 with the connector stud 150 is then inserted into the central bore 108 deforming or dilating the elastomeric material 104 in an interference fit relationship to form a void-free interfacial contact between the outer surfaces or periphery of the arrester element and the bore surface of the elastomeric material 104. As in FIG. 3, the installation is completed by the insertion of a ground connector 110 into the bore 108. As the elastomeric material 104 is stretched, the ground connector 110 is forced against the arrester element 26 thereby forcing the connector stud 150 into firm electrical contact with the center conductor 12*a*.**

Alternatively, the arrester 100 of FIG. 4 allows for the factory assembly of the connector stud 150, the arrester element 26, and the ground connector 100 within the central bore 108. During the field assembly to a prepared cable 12, the arrester enclosure 100 is dilated over a proximate end of the cable 12. Next, the bore 108 is stretched to retract the arrester element 26 and the connector stud 150 to allow the arrester enclosure 100 to be moved along the cable 12 until the arrester enclosure 100 is centered over the exposed conductor **12*a*. In this centered position, the force of the stretched bore 108 will bias the connector stud 150 into electrical contact with the conductor 12*a*. The arrester of FIG. 3 may be similarly assembled when the threaded connector stud 120 is replaced by an unthreaded stud which may be biased into a suitable groove provided centrally on the conductor connector 116**.

In accordance with further important aspects of the present invention and referring now to FIG. 5, an elbow-shaped arrester 160 is integrally provided with a bushing receptacle or other separable insulated connector interface in one leg of the elbow and an arrester element 26 within the other leg.

The laminated enclosure of the arrester 160 includes an insulating elastomeric housing 162 having an arrester housing bore 164 in one leg and a conductive elastomeric housing jacket 166 for shielding the insulating elastomeric enclosure layer 162. The conductive elastomeric housing jacket 166 may be premolded and the insulating elastomeric housing 162 may be molded therein. The leg of the elbow opposite the arrester enclosure leg is formed as a bushing receptacle in a specific embodiment by forming a truncated conical bore 168 designed to interfit over a mating apparatus bushing. The dimensions of the truncated conical bore 168 are determined by the standard dimensions of the bushing intended for insertion therein, in atmosphere excluding engagement.

A conductive elastomeric shield 170, which may be formed from the same conductive elastomeric material as the housing jacket 166, is molded within the center of the elbow and adjoining the arrester element bore 164. A line connection stud or probe 172 is inserted into the bushing receptacle bore 168 and into contact with a mating bore of the shield 170. The line connection stud 172 includes a flattened portion 173 which is inserted into the conductive elastomeric element 170. The flattened portion 173 has a transversely threaded bore 175. A threaded stud 174 similar to the stud 120 of FIG. 3 is attached to the line connection stud or probe 172.

The arrester element is inserted into the bore 164 which is of a smaller diameter than the diameter of the arrester element 26 as discussed hereinbefore. Upon insertion, the arrester element 26 deforms or dilates the elastomeric material 162 adjacent the bore 164 to form an interference fit relationship, thus excluding air and sealing therebetween. A disconnector 176 as discussed hereinbefore is shown assembled bellow and in contact with the lowermost MOV valve block 32 and includes a threaded ground stud 178.

In a specific alternate embodiment, the arrester element 26, the shield 170, the threaded stud 174 and the line connection stud 172 may be integrally molded within the insulating elastomeric housing 162. A clamping band 180 is fitted around the conductive elastomeric housing jacket 166 and tightened to retain the disconnector 176 and prevent undesirable rotation such as caused by the tightening of a nut on the ground stud 178. To this end, an annular groove 182 is formed in the housing of the disconnector 176 with the elastomeric material 162 filling the groove 182 upon the tightening of the clamping band 180. Alternatively, an annular ridge may be molded integrally with the elastomeric housing 162 to mate within the groove 182.

In accordance with further important aspects of the present invention, and referring now to FIGS. 6 and 7, submersible arresters 200 (FIG. 6) and 225 (FIG. 7) are fabricated by integrally molding arrester components within a laminated enclosure including an insulating housing and a conductive layer or jacekt. The jacket excludes air and moisture along the adjacent housing surface, and electrically shields the housing.

The arresters 200 and 225 may then be utilized by insertion into a mating elastomeric arrester receptacle such as the arrester receptacle 250 with integral cable tap of FIG. 9; the arrester receptacle 275 with integral bushing receptacle of FIG. 10; and the arrester receptacle 290 with integral cable enclosure of FIG. 11.

Further, the arrester 225 of FIG. 7 and the arrester 200 of FIG. 6 may also be inserted into various separable insulated connector components. For example, the arrester 200, 225 may be threaded onto the conversion stud 24 of the separable splice connector 10, FIG. 1, described in U.S. Pat. No. 3,980,374 to which reference may be made and which is hereby incorporated by reference for all purposes. Also, the arrester 200, 225 may be inserted into the test point leg of a K65OLR power distribution connector manufactured by the Elastimold Division of the Amerace-ESNA Corporation of Hackettstown, N.J., described at pages 1 and 2 of Catalog No. 470-11. Arrester elements may also be positioned within cable enclosure portions of the K65OLR housing, or the like.

The arrester 200 of FIG. 6 includes an insulating housing 202 which is molded about the serially disposed arrester components including a threaded metal connector 204, a valve element 206, a gap element 208, and a disconnector 210, all substantially as described hereinbefore and in U.S. Pat. No. 3,869,650. The gap electrodes 211 may have outer surfaces either extending to the housing 202 or shielded within the cylindrical spacers 209.

The insulating housing 202 may be laminated. For example, a first layer may be a coating of epoxy applied to the outer surfaces of the stacked serially disposed arrester components. The coating will exclude air from the outer surfaces, seal the components, and unitize the stacked components for ready centering in a mold. A second layer applied within a mold will exclude air from the surfaces of the first layer, and complete the form of the housing 202.

In a specific embodiment, a firm insulating material, filled epoxy resin for example, is utilized for molding the insulating layer 202. An elastomeric polymer may be utilized when suitable adhesives are applied to the arrester components. An outer cylindrical conductive jacket 220 covers and shields a lower cylindrical portion of the insulating housing 202. In a specific embodiment, the jacket 220 is preformed, dilatable, and forced onto the molded insulating housing 202. Alternatively, the jacekt may have the insulation 220 molded within, or may be subsequently coated over a premolded insulating housing 202.

Referring now to FIG. 7, the arrester 225 is fabricated similarly as the arrester 200 of FIG. 6. An insulating housing 226 surrounds the arrester components which include a threaded metal connector 228, a valve element 230 and a threaded ground terminal assembly 232. A conductive jacket 234 shields the insulating housing 236. If a disconnector is not provided in either the arrester of FIG. 6, or the arrester of FIG. 7, the respective conductive jacket 220 and 234 may be formed to cover the lower ground connection surfaces and electrically contact the terminal 232.

The arresters 200 and 225 each include an upper truncated conical portion including an annular base 236. The conductive jackets 220 and 234 extend to within a predetermined distance of the annular base 236.

Referring now to FIG. 9 and in accordance with further important aspects of the present invention, the arrester receptacle 250 with integral cable tap is generally similar to the arrester 100 of FIGS. 3 and 4. The arrester receptacle 250 includes a generally T-shaped conductive elastomeric jacket 252 covering and shielding an insulating elastomeric housing 254 having a cable sealing bore 256 therethrough and a conductive elastomeric shield 258 formed around the midpoint of the cable passageway 256. A central receptacle bore 260 in the shape of a truncated cone is also formed generally perpendicularly to the cable passageway 256 in the center leg of the T-shaped elastomeric housing 254 that is dimensioned to interfit with and form a receptacle for the truncated conical portion of the arrester 200 or the arrester 225. The central receptacle bore 260 near the opening forms an annular base 262. The conductive housing 252 extends beyond the base 262 defining a cylindrical conductive surface or ring 264 which interfits with portions of the respective conductive jackets 220 or 234 when the respective arrester 200 or 225 is inserted in voltage grading and sealing relationship.

As described hereinbefore in conjunction with the arrester 100 of FIG. 4, the cable 12 is prepared by exposing predetermined lengths of the conductor **12*a* and the conductor insulation 12*b*. A generally U-shaped metallic connector clamp 265 having a threaded opening 267 in one leg is positioned to surround the conductor 12*a*. The arrester receptacle 250 is positioned over the prepared section of the cable 12. A cable tap connector 266 is then inserted through the arrester receptacle bore 260. The cable tap connector 266 includes a threaded stud 268 which contacts the center connector 12***a* when passed through a sleeve portion 270 of the conductive elastomeric element 258 and threaded through the threaded leg opening 267 of the connector clamp 265. The cable tap connector 266 also includes a lower threaded portion 274 which includes a screwdriver slot or the like for tightening the cable tap connector 266 within the threaded connector clamp 265 and against the conductor 12*a*.

The arrester 200 or the arrester 225 is then inserted and rotated into the receptacle bore 260 in an interference fit relationship. The threaded sleeve 204 or 208 engages the threaded portion 274 and as rotation is continued, pulls the arrester into the receptacle to form an atmosphere excluding and voltage grading contact between the arrester and the bore 260. The ring 264 overlaps and shields the exposed insulation 206, 226 adjacent the base 236 and contacts the conductive jackets 220, 234 to establish a complete conductive surface for the arrester 200, 225. Thus the arrester 200, 225 is fully inserted by threading the stud 274 into one of the respective connectors 204, 228.

It should be understood that while specific arresters 200 and 225 are illustrated and described, arresters of various voltage ratings using arrester elements of various sizes and serial arrangements as well as having various pluralities of valve blocks, spacer elements, etc. are contemplated with appropriate dimensional changes in the lower housing and the upper truncated conical portions, which may be in accordance with voltage ratings and dimensions as specified in American National Standard C 119.2.

Similarly the elastomeric arrester receptacle with integrally provided bushing receptacle of FIG. 10 and the elastomeric arrester receptacle with integrally provided cable enclosure 290 of FIG. 11 include truncated conical arrester receptacle bores 260 the dimensions of which are determined by the standard dimension of the arrester intended for insertion.

The elastomeric elbow-shaped arrester receptacle 275 is similar in construction to the elbow-shaped arrester 160 of FIG. 5 and is integrally provided with a bushing receptacle or other separable insulated connector interface. The bushing receptacle is connectable to a mating connector bushing as may be found in various electrical apparatus such as a pad mount distribution transformer, for example. A line connector stud or probe 276 includes a threaded sleeve for connection to a threaded stud of an L-shaped pin 278 having a threaded stud 280 for attachment to the threaded sleeve of the arrester 200 or 225.

The arrester receptacle 290 of FIG. 11 is integrally provided with a cable enclosure 291 axially aligned with the truncated conical arrester receptacle bore 260. A lock washer 292 is embedded within a conductive elastomeric shield 294. A crimp cable connector 296 attached to the center conductor 12*a* of the inserted prepared cable 12 is inserted through the lock washer 292.

The cable connector 296 includes a threaded stud portion 298 which extends into the receptacle bore 260 to secure the mating threaded sleeve connector 204 or 228 of the arrester 200 or 225 respectively. A nut 300 is threaded over the stud 298 prior to the insertion of the arrester 200 or 225 to secure the stud 298. A tongue and groove arrangement 302 having tongue portions formed on the cable connector 296 and mating grooved portions in the lock washer 292 complete the interlocking of the cable connector 296. A length of cable extending from the receptacle is provided to allow for the attachment of a standard separable insulated connector elbow, which in turn is then connected to an apparatus bushing.

In accordance with further important aspects of the present invention and referring now to FIG. 8, an overhead arrester 310 including a plurality of sheds 324 for outdoor atmospheric environments is fabricated having air free sealed, moisture excluding interfacial contact between adjacent outer surfaces of the arrester components, including alternately positioned metal spacer elements 314, and the inner surfaces of the insulating elastomeric housing 312. The arrester components, including the spacer elements 314, are formed to dilate the housing 312 and to form the atmosphere excluding interfacial contact.

The arrester components may be precoated, with an epoxy resin for example, to form smooth outer surfaces. Further, the valve element, spacer elements, and/or the housing bore may be lubricated with a silicone grease to aid insertion. The arrester enclosure is laminated and includes an insulating layer 312 molded over a layer or shield 330 of conductive elastomer. The arrester enclosure is laminated in a specific alternative embodiment by a layer of insulating adhesive at the outer surfaces of the arrester components.

In an alternate embodiment, a rigid insulating material, a filled epoxy resin for example, may be molded as a formed dielectric body surrounding and sealing the arrester components and forming an insulating housing as a complete arrester enclosure. In a specific embodiment, the molding operation includes the step of applying an insulating layer for sealing and unitizing the arrester components.

When the length of the housing 312 is determined by the necessary external creepage path and strike distance requiring an overall length greater than the required number of MOV valve blocks for a particular voltage rating, spacer elements 314 are utilized to occupy the remaining length of the housing to connect the blocks 316, to raise the withstand voltage of the housing, and to distribute heat. For example, placing all the valve blocks 316 together with spacers either above or below would result in lower withstand voltage levels and in greater heat concentration than that provided by the valve blocks 316 spaced as shown in FIG. 8.

In an alternative embodiment, the overhead surge arrester of FIG. 8 may be fabricated using a preformed rigid insulating housing, porcelain for example, having a bore wherein an air separation may be formed between the MOV valve blocks and the bore of the housing and between the conductive spacers and the bore of the housing. With such construction and in accordance with a further important aspect of the present invention, spacers between at least some of the MOV valve blocks and a spring to maintain the blocks and spacers in position within the bore are effective to raise corona inception levels and to raise the voltage withstand levels both within the bore and across the exterior of the arrester, particularly when the exterior surfaces are wet or otherwise contaminated.

In yet another alternative embodiment, voltage stress levels throughout an arrester may be greatly reduced when MOV valve blocks are used in series with nonmetallic spacers having electrical impedance approximately equal to that of the MOV valve blocks under normal system operating voltage. With such conductive spacers, system voltage can be graded or divided substantially evenly along the entire length of a stack of MOV valve blocks and conductive spacers, thus effecting the aforesaid reduction in voltage stress levels. The impedance of the conductive spacers used in series with the MOV valve blocks need not be as non-linear as the inherent impedance of the MOV valve blocks, and under such conditions, overvoltages will cause excessive voltage increases across the spacers as compared to the valve blocks. The conductive spacers also include a bore within which a spark gap is included. The spark gap will be ionized by the transient overvoltage, thereby allowing transient overvoltage energy to be discharged through the gaps and through the MOV valve blocks, while bypassing the spacers.

FIG. 8 may be utilized to illustrate this alternative embodiment. For example, with each block 316 and spacer 314 being of equal length and of equal impedance to normal system voltage, the total impedance of the three blocks plus two spacers will be two-thirds greater than when the spacers are made of metal, such as aluminum. One-fifth of the normal system voltage will appear across each of the five blocks and spacers.

Gaps within the spacers, shown formed between a metal disc 320 and an elongate electrode 322, shown in phantom, may each be adjusted to withstand at least one-fifth of the normal system voltage, and the sparkover protective characteristics of this arrester may be reduced to as little as two-fifths of that provided by gapped valve arresters of the prior art.

This occurs since the gap element of the prior art valve-type arresters are required to withstand very nearly the full normal system voltage while in accordance with an important aspect of the present invention, the gap element is required to withstand only a fraction of the normal system voltage. Further, the greater impedance of the arrester described above will reduce normal system current conducted through the arrester, thereby reducing associated energy losses.

It should be noted that the simple gaps described hereinbefore need not be capable of interrupting power follow current, since MOV valve blocks are capable of discharging transient energy without incidence of power follow current. However, it is anticipated that gaps capable of interrupting power follow current and being of a current limiting type, for example, a gap constructed in accordance with my copending application Ser. No. 648,758 filed Jan. 13, 1976 will allow for reductions in the quantity of the comparatively expensive MOV valve blocks, as compared to the present cost of the silicon carbide valve blocks, used to produce an arrester meeting performance requirements.

In another embodiment of the arrester of FIG. 8, the insulating sheds 324 may be molded separately, rather than as an integral portion of the insulating housing 312, wherein the housing 312 would include an elongated outer cylindrical surface. Separately molded dilatable weather resistant sheds, of alumina trihydrate filled ethylene propylene rubber, for example, may then be dilated by forcing the sheds having a predetermined inside diameter over a lubricated insulating housing having a larger predetermined outer diameter to form a sealed interfacial contact along the outer surface of the housing. Thus, by this method, layered arrester enclosures are formed by combining rigid insulating housings of inferior weather resistance with dilatable sheds of superior weather resistance to form superior arrester enclosures. The form of the sheds as well as a method of attaching the sheds may be similar to that as described in U.S. Application Ser. No. 727,757 filed By G. E. Lusk et al on Sept. 29, 1976 which is hereby incorporated by reference.

In other alternate specific embodiments of FIGS. 1 and 2, the covers 18 and 24 may be formed of corrosion resistant steel plate or of cast metals of sufficient thickness to withstand the effects of arrester element failure, this is, the explosive forces generated as well as the eroding effects of prolonged fault current arcing to the cover surfaces.

In alternative specific embodiments of the arresters of FIGS. 3 and 4, the connector studs 120 and 150 are replaced by conductive spring biased connection devices so formed as to cause spring biased permanent connection to the connector 116 or the conductor **12*a*** automatically upon centering the arrester in a predetermined position.

In alternate specific embodiments of the arresters of FIGS. 3 and 4, and the arrester receptacles of FIGS. 9 and 11, the cable enclosure portions are enlarged to accommodate cable adaptors 18 as shown in FIG. 1 of U.S. Pat. No. 3,980,374.

While specific embodiments of arresters and arrester receptacles of the present invention have been shown and described hereinbefore, it should also be understood that any combination of arrester components, arrester enclosures, cable enclosures, arrester receptacles, separable insulated connector interfaces, and metallic covers are contemplated within the teachings of the present invention.

In further specific embodiments, each of the outer conductive layers or jackets shielding the arresters herein described is provided with an attachment arrangement, such as a conductive elastomeric eyelet 253, FIG. 10, to attach a grounding wire.

Obviously, many modifications and variations of the present invention are possible in light of the above teachings. Thus, it is to be understood, that, within the scope of the appended claims, the invention may be practiced otherwise than as specifically described above. As used hereinafter, the term "surge arrester" refers to an overhead or outdoor arrester (for example, 310 in FIG. 8) or a submersible arrester (for example, 10, 100, 160, 200 and 225 in FIGS. 2, 3, 5, 6 and 7). The term "arrester enclosure" for a submersible arrester refers to an insulating housing (for example, 104 in FIG. 3) and may include an outer conductive layer or jacket (for example, 102 in FIG. 3) and for an overhead arrester refers to an insulating housing (for example, 312 in FIG. 8). The term "arrester components" refers to one or more of the following, all of which are preformed before positioning within an arrester enclosure: an arrester element, a high voltage connector (for example, 120 in FIG. 3), a ground connector (for example, 110 in FIG. 3) and a disconnector (for example, 176 in FIG. 5). The term "arrester element" refers to a valve element and may include a gap element. The term "valve element" refers to one or more valve blocks made from negative resistance material (for example, silicone carbide valve blocks or metal oxide, MOV, valve blocks—e.g., 28, 30 and 32 in FIG. 2). As conventionally used in this art, the term "valve block" as used hereinafter refers to a three-dimensional rigid block of negative resistance material formed prior to insertion within an arrester enclosure, as distinguished from a mass of granules (for example, the mass of silicone carbide crystals 10 in FIG. 1 of U.S. Pat. No. 2,860,210)

formed within an arrester enclosure by being poured therein with or without a suitable binder. The term "gap element" refers to one or more spark gaps, each spark gap being formed by one or more gap electrodes (for example, 211 in FIG. 6) and/or one or more gap spacers (for example, 209 in FIG. 6).

What is claimed and desired to be secured by Letters Patent of the United States is:

1. A surge arrester for connecting to a component of an electrical power circuit comprising
arrester components including a valve element formed by onee or more valve blocks,
a formed dielectric body for housing said arrester components, said dielectric body comprising means for forming a substantially air-free interface encircling said arrester components when said arrester components are inserted into said dielectric body and said dielectric body being fabricated from an elastomeric material to define a central bore which is of a smaller diameter than said arrester components, said bore being dilatable about said arrester components, and
a cover of conductive material encircling at least a portion of said dielectric body.

2. The surge arrester as defined in claim 1 wherein said valve blocks are coated prior to insertion into said bore to form smooth peripheral surfaces.

3. The surge arrester as defined in claim 1 wherein said valve blocks are lubricated prior to insertion into said bore.

4. The surge arrester as defined in claim 1 wherein said arrester components further include an electrical connection device for disposal at each end of said valve element.

5. The surge arrester as defined in claim 4 wherein one of said electrical connection devices is connectable to an electrical power circuit and the other electrical connection device is connectable to a ground potential, said arrester components further including means for automatically disconnecting said other electrical connection device upon the electrical failure of said valve element.

6. A surge arrester for connecting to a component of an electrical power circuit comprising
arrester components including a valve element formed by one or more valve blocks,
a formed dielectric body for housing said arrester components, said dielectric body comprising means for forming a substantially air-free interface encircling said arrester components, the inner surface of said dielectric body being in interfacial contact with the outer surfaces of said arrester components and said air-free interface being the interface between said inner surface of said dielectric body and said outer surfaces of said arrester components,
a cover of conductive material encircling at least a portion of said dielectric body, and
receptacle means for enclosing said dielectric body, said receptacle means comprising means for electrically connecting to and hermetically sealing to a mating separable insulated connector component and for electrically connecting said arrester components to said mating separable connector component and including a second formed dielectric body and a second cover of conductive material encircling at least a portion of said second dielectric body, said second formed dielectric body and said second cover of conductive material being physically distinct respectively from said first-mentioned formed dielectric body and from said first-mentioned cover of conductive material.

7. A surge arrester for connecting to a component of an outdoor electrical power circuit comprising
arrester components, said arrester components including an arrester element having at least two metal oxide valve blocks and at least one or more conductive elongate spacers, said valve blocks and said conductive elongate spacers arranged in an alternating relationship,
a formed dielectric body for housing said components,
means for forming a substantially air-free interface encircling said arrester components, and
means for increasing the electrical creepage path across an outer surface of said body, said increasing means including a plurality of insulating sheds.

8. The surge arrester of claim 7 wherein said arrester components include at least three metal oxide valve blocks and at least two elongate spacers.

9. A surge arrester comprising
an elongated, insulating housing having a central bore and
arrester components disposed in said bore, said arrester components comprising at least two metal oxide valve blocks and means for decreasing the voltage stress levels throughout the surge arrester, said stress decreasing means comprising elongated spacer means disposed in a predetermined relationship with said valve blocks and having an electrical impedance approximately equal to that of one of said metal oxide blocks under the nominal system voltage of said arrester.

10. The surge arrester of claim 9 wherein said arrester components further comprise a spark gap formed within said spacer means.

11. An elastomeric arrester receptacle comprising
an insulating elastomeric housing including an arrester receptacle bore and a cable passageway formed therein,
an outer conductive elastomeric jacket disposed over said insulating elastomeric housing and
means extending into said arrester receptacle bore for establishing an electrical connection to an insulated electrical connection device,
said arrester receptacle bore formed and dimensioned to form an interference fit with an inserted arrester thereby establishing an air-free interfacial contact with the inserted arrester, said connection establishing means interfitting with a mating connector of the inserted arrester and comprising a cable connector, said cable connector comprising a threaded fitting extending into said arrester receptacle bore.

12. An elastomeric arrester receptacle comprising
an insulating elastomeric housing including an arrester receptacle bore and a separable insulated connector receptacle bore formed therein,
an outer conductive elastomeric jacket disposed over said insulating elastomeric housing and
means extending into said arrester receptacle bore for establishing an electrical connection to an insulated electrical connection device,
said arrester receptacle bore formed and dimensioned to form an interference fit with an inserted arrester thereby establishing an air-free interfacial contact with said inserted arrester, said connection establishing means interfitting with a mating connector of the inserted arrester and comprising a threaded fitting extending into said arrester receptacle bore.

13. A surge arrester for connection to an insulated power cable comprising:

first and second interfitting housings each comprising a metallic housing cover, a conductive elastomeric layer and an insulating elastomeric layer disposed within said conductive elastomeric layer and having a cable passageway formed therein interfitting when said housings are interfitted;

an arrester element disposed within said second housing; and cable connection means in electrical contact with said arrester element for contacting the center conductor of said insulated power cable upon the interfitting and assembly of said housings about said insulated power cable.

14. The surge arrester of claim 13 wherein said cable connection means comprises a metallic flange and a protruding sharpened tip portion.

15. A surge arrester for connecting to a component of a high voltage electrical power circuit comprising an arrester element including a valve element formed by one or more valve blocks, an arrester enclosure including a dielectric housing and a conductive means encircling said housing for maintaining the outer surface of said housing at a reference potential, said dielectric housing comprising means for excluding substantially all of the air at the interface between said arrester element and said dielectric housing, said dielectric housing comprising dielectric material molded around said arrester element.

16. A surge arrester as defined in claim 15 wherein said arrester element further includes a cap element.

17. A surge arrester as defined in claim 15 wherein said one or more valve blocks comprise one or more metal oxide valve blocks.

18. A surge arrester as defined in claim 15 further comprising a disconnector disposed at one end of said dielectric housing.

19. A surge arrester as recited in claim 15 wherein said dielectric housing adheres to said arrester element at an air-free interface between said dielectric housing and said arrester element.

20. A surge arrester as recited in claim 15 wherein said valve element comprises a plurality of metal oxide valve blocks.

21. A surge arrester as recited in claim 15 wherein said valve element comprises a plurality of silicon carbide valve blocks.

22. A surge arrester for connecting to a component of a high voltage electrical power circuit comprising an arrester element including a valve element formed by one or more valve blocks, an arrester enclosure including a dielectric housing formed from an elastomeric material and a conductive means encircling said housing for maintaining the outer surface of said housing at a reference potential, said dielectric housing comprising means for excluding substantially all of the air at the interface between said arrester element and said dielectric housing, said dielectric housing including a central bore of a smaller diameter than the diameter of said one or more valve blocks, said dielectric housing being dilatable about said one or more valve blocks.

23. A surge arrester as defined in claim 22 wherein said arrester element further includes a gap element.

24. A surge arrester as defined in claim 22 wherein said one or more valve blocks comprise one or more metal oxide valve blocks.

25. A surge arrester as defined in claim 22 further comprising a disconnector disposed at one end of said dielectric housing.

26. A surge arrester as recited in claim 22 wherein said dielectric housing adheres to said arrester element at an air-free interface between said dielectric housing and said arrester element.

27. A surge arrester as recited in claim 22 wherein said valve element comprises a plurality of metal oxide valve blocks.

28. A surge arrester as recited in claim 22 wherein said valve element comprises a plurality of silicon carbide valve blocks.

29. A surge arrester for providing overvoltage surge protection for one or more components of an outdoor high voltage electrical power circuit comprising an arrester element having an outer peripheral surface, said arrester element including a valve element formed by one or more valve blocks, and means for housing said arrester element, said housing means comprising a dielectric material having an outer surface including a plurality of formed outer weather sheds and a dilatable inner surface adapted to be expanded by the receipt of said arrester element to maintain an air-free or atmosphere excluding interface with said outer peripheral surface of said arrester element within said housing means.

30. A surge arrester as recited in claim 29 wherein said arrester element comprises a plurality of metal oxide valve blocks and at least one elongated, conductive spacer disposed between and spacing apart said valve blocks, the outer diameter of said spacer being substantially equal to the outer diameter of said metal oxide valve blocks.

31. A surge arrester as recited in claim 29 wherein said valve element comprises a plurality of valve blocks secured together as a unitary component prior to receipt within said housing means.

32. A surge arrester for providing overvoltage surge protection for one or more components of an outdoor high voltage electrical power circuit comprising an arrester element having an outer peripheral surface, said arrester element including a valve element formed by one or more valve blocks, and means for housing said arrester element, said housing means comprising a dielectric material formed from a resin molded about said arrester element to form a plurality of weathersheds and molded about said arrester element such that the inner surface of said dielectric material maintains an air-free or atmosphere excluding interface with said outer peripheral surface of said arrester element within said housing means.

33. An elastomeric surge arrester receptacle comprising an insulating, dilatable elastomeric housing including an arrester element receptacle bore formed therein and an outer conductive elastomeric jacket disposed over said insulating elastomeric housing, said arrester element receptacle bore adapted to establish an air-free or atmosphere excluding interfacial contact with an arrester element upon the dilation of said dilatable elastomeric housing by the receipt of said arrester element within said bore of said dilatable elastomeric housing.

34. An elastomeric surge arrester receptacle comprising an elbow-shaped insulating elastomeric housing including a truncated conical arrester receptacle bore formed therein and a bushing receptacle bore formed therein perpendicularly to said arrester receptacle bore, an outer conductive elastomeric jacket disposed over said insulating elastomeric housing, conductive means extending into said arrester receptacle bore for establishing an electrical connection to a surge arrester receivable in said arrester receptacle bore and conductive means extending into said bushing receptacle bore for establishing an electrical connection to an apparatus bushing, said arrester receptacle bore being dimensioned to form an interference fit with an inserted surge arrester to thereby establish an air-free interfacial contact with said inserted surge arrester, said conductive means extending into said arrester receptacle bore being electrically short-circuited to said conductive means extending into said bushing receptacle bore.

35. An elastomeric surge arrester receptacle for receiving a surge arrester to provide overvoltage surge protection for one or more components of a high voltage power circuit comprising an insulating elastomeric housing including a truncated conical arrester receptacle bore formed therein, an outer conductive elastomeric jacket disposed over said insulating elastomeric housing, first conductive means extending into said arrester receptacle bore for establishing an electrical connection to a surge arrester receivable in said arrester receptacle bore and seond conductive means electrically short-circuited to said first conductive means for establishing an electrical connection to a component of said high voltage power circuit, said arrester receptacle bore being dimensioned to form an interference fit with an inserted surge arrester to thereby establish an air-free interfacial contact with said inserted surge arrester.

36. An elastomeric surge arrester receptacle as recited in claim 35 wherein said housing further includes a high voltage power cable receiving bore formed therein and wherein said second conductive means comprises means for establishing an electrical connection to the center cable conductor of a high voltage insulated power cable.

37. An elastomeric surge arrester receptacle as recited in claim 36 wherein said power cable receiving bore is perpendicular to said arrester receptacle bore.

38. A surge arrester having component parts capable of being affixed to an insulated power cable intermediate the terminal ends of said power cable for establishing an electrical connection to a high voltage power circuit to provide surge protection for one or more components of said power circuit comprising an insulating elastomeric housing including a first bore formed therein for receiving an insulated power cable therein and a second bore formed therein for receiving arrester components therein, an outer conductive jacket disposed about said insulating elastomeric housing, arrester components including one or more valve blocks adapted to be received within said second bore, and conductive means for establishing a short-circuit electrical connection between at least one of said arrester components and an insulated power cable intermediate the terminal ends of said power cable upon receipt of said power cable in said first bore, said first bore extending entirely through said housing to enable said conductive means to establish said electrical connection to said power cable passing into, through and out of said first bore in said housing.

39. A method for providing surge protection for a high voltage power system comprising the steps of selecting a portion of an insulated high voltage power cable between its terminal ends for connecting a surge arrester thereto, preparing a predetermined length of said portion of said power cable for attachment to said surge arrester, positioning a surge arrester about said length after said length is prepared and establishing short-circuit electrical connections between the central cable conductor of said power cable and one end of said surge arrester and between the opposite end of said surge arrester and ground.

40. A surge arrester for connecting to a component of a high voltage power circuit comprising an arrester element including a valve element formed by one or more valve blocks, said arrester element having an outer periphery and means for housing said arrester element, said housing means comprising means for excluding air from said outer periphery to prevent the formation of corona at said outer periphery and including a first inner elastomeric layer having a first inner surface for enclosing said arrester element and configured to maintain an atmosphere excluding contact with said outer periphery and a second outer elastomeric layer having a second inner surface surrounding said first inner layer and configured to maintain an atmosphere excluding contact with said first inner layer.

41. A surge arrester as defined in claim 40 further comprising a third conductive layer disposed about said second layer and configured to maintain an atmosphere excluding contact with said second layer.

42. A surge arrester for connection to a high voltage power circuit comprising an arrester element and an insulating housing having an outer surface formed by a plurality of weathersheds and having an internal elongated bore, said arrester element including at least three metal oxide valve blocks and at least two elongated tubular spacers serially disposed between the first and the third valve blocks and having a total combined length of at least 50% of the total combined length of said valve blocks.

43. A cable splice having component parts for electrically interconnecting prepared cable portions of one or more high voltage power cables of the type having a center conductor surrounded by an insulating layer that in turn is surrounded by a conductive sheath comprising an arrester element including one or more valve blocks, an insulating elastomeric housing including a cable passageway for receiving prepared cable portions of one or more high voltage power cables and including a bore for receiving said arrester element, first conductive means disposed over the exterior of said housing for maintaining said exterior electrically at ground potential, second conductive means for electrically interconnecting the bared center conductors of said cable portions and adapted to be disposed in said cable passageway in an assembled condition, third conductive means for electrically interconnecting the conductive sheaths of said cable portions with said first conductive means, fourth conductive means for electrically connecting one end of said arrester element to said bared center conductors of said cable portions and fifth conductive means for electrically connecting the other end of said arrester element to an electrical ground.

44. A cable splice as recited in claim 43 wherein said housing comprises a dilatable housing adapted to be dilated upon the receipt of said arrester element in said bore for maintaining an atmosphere excluding contact between the exterior of said arrester element and the interior of said bore.

45. A surge arrestor for providing overvoltage surge protection for one or more components of a high voltage electrical power circuit comprising arrester components, said arrester components including an arrester element having an outer peripheral surface, said arrester element including a valve element formed by one or more valve blocks, and means for electrically connecting said arrester element to a component of a high voltage electrical power circuit, and means for housing said arrester components, said housing means comprising dielectric means for excluding air from said outer peripheral surface of said arrester element within said housing means, at least two of said arrester components being secured together as a unitary component prior to disposition within said housing means.

46. A method of manufacturing a surge arrester for providing overvoltage surge protection to a component of a high voltage electrical power circuit comprising the steps of forming a valve element having an outer surface and including a plurality of valve blocks and subsequently enclosing said valve element within an arrester housing formed from a dielectric material and having conductive material encircling at least a portion of said dielectric material, said enclosing step comprising the step of excluding substantially all of the air from said outer surface of said valve element.

47. A method of manufacturing a surge arrester for providing overvoltage surge protection to a component of a high voltage electrical power circuit comprising the steps of forming a valve element having an outer surface and including a plurality of valve blocks and subsequently enclosing said valve element within an arrester housing formed from a dielectric material and having conductive material encircling at least a portion of said dielectric material, said enclosing step comprising the step of excluding substantially all of the air from said outer surface of said valve element, and excluding step comprising the step of dilating said arrester housing by disposing said valve element therein.

48. A method of manufacturing as defined in claim 46 wherein said excluding step comprises the step of molding said dielectric material about said outer surface of said valve element.

49. A method of manufacturing as defined in claim 46 wherein said forming step comprises the step of unitizing said valve element by securing said valve blocks together as a unitary component.

50. A surge arrester for providing overvoltage surge protection to a component of a high voltage electrical power circuit comprising an elongated arrester housing and arrester components disposed within said housing, said arrester components including a valve element including a plurality of at least three valve blocks, and at least two elongated, rigid, metallic, conductive spacers, each of said spacers being serially disposed between different pairs of said plurality of valve blocks.

51. A surge arrester for providing overvoltage surge protection to a component of a high voltage electrical power circuit comprising an elongated dielectric body having a central bore and arrester components, said arrrester components including a valve element having at least two metal oxide valve blocks and means for decreasing the voltage stress levels throughout the arrester, said stress decreasing means comprising elongated conductive spacer means disposed in a predetermined relationship with said valve blocks, the electrical impedance of said conductive spacer means being of a magnitude sufficient to sustain no greater than seventy percent of the voltage applied to said surge arrester when said applied voltage equals the normal operating voltage of said surge arrester, said spacer means having a spark gap disposed within said spacer means for electrically by-passing said spacer means during the discharge of an overvoltage surge through said surge arrester.

52. A surge arrester for connecting to a component of a high voltage electrical power circuit comprising arrester components, a dielectric body for housing said arrester components, and a cover of conductive material in direct physical contact with the outer surface of said dielectric body and encircling at least a portion of at least a majority of said arrester components, said dielectric body being in interfacial contact with said arrester components and comprising means for forming a substantially air-free interface between said arrester components and said dielectric body, said dielectric body comprising dielectric material molded around said arrester components.

53. A surge arrester for connecting to a component of a high voltage electrical power circuit comprising arrester components, a formed dielectric body for housing said arrester components, and a cover of conductive material in direct physical contact with the outer surface of said dielectric body and encircling at least a portion of at least a majority of said arrester components, said dielectric body being in interfacial contact with said arrester components and comprising means for forming a substantially air-free interface between said arrester components and said dielectric body, said dielectric body being dilatable about said arrester components.

54. A surge arrester for connecting to a component of a high voltage electrical power circuit comprising arrester components, an insulating housing for said components, a cover of conductive material in direct physical contact with the outer surface of said housing and encircling at least a portion of at least a majority of said arrester components, and an insulating adhesive layer at the outer surfaces of said arrester components.

55. The surge arrester defined in claim 54 wherein said housing comprises dielectric material molded around said components and said adhesive layer.

56. A cable splice having component parts for electrically interconnecting prepared cable portions of one or more high voltage power cables of the type having a center conductor surrounded by an insulating layer that in turn is surrounded by a conductive sheath comprising an arrester element including one or more valve blocks, insulating means including a cable passageway for receiving prepared cable portions of one or more high voltage power cables and including a bore for receiving said arrester element, said insulating means comprising at least one of said component parts of said cable splice, first conductive means disposed over the exterior of said insulating means for maintaining said exterior electrically at ground potential, second conductive means for electrically interconnecting the bared center conductors of said cable portions and adapted to be disposed in said cable passageway in an assembled condition, third conductive means for electrically interconnecting the conductive sheaths of said cable portions with said first conductive means, fourth conductive means for electrically connecting one end of said arrester element to said bared center conductors of said cable portions and fifth conductive means for electrically connecting the other end of said arrester element to an electrical ground.

57. A cable splice as recited in claim 56 wherein at least a portion of said insulating means comprises dilatable housing means adapted to be dilated upon the receipt of said arrester element in said bore for maintaining an atmosphere excluding contact between exterior of said arrester element and the interior of said bore.

* * * * *

UNITED STATES PATENT OFFICE
CERTIFICATE OF CORRECTION

Patent No. 4,161,012 Dated July 10, 1979

Inventor(s) FRANCIS V. CUNNINGHAM

It is certified that error appears in the above-identified patent and that said Letters Patent are hereby corrected as shown below:

Claim 1, column 15, line 12, change "onee" to --one--;

Claim 16, column 17, line 37, change "cap" to --gap--;

Claim 47, column 22, line 9, delete "and" and insert --said--; and

Claim 57, column 24, line 29, insert --the-- after "between".

Signed and Sealed this

*Sixteenth* Day of *October 1979*

[SEAL]

*Attest:*

RUTH C. MASON
*Attesting Officer*

LUTRELLE F. PARKER
*Acting Commissioner of Patents and Trademarks*

Disclaimer

4,161,012.—*Francis V. Cunningham,* Western Springs, Ill. HIGH VOLTAGE PROTECTION APPARATUS. Patent dated July 10, 1979. Disclaimer filed Nov. 9, 1981, by the assignee, *Joslyn Mfg. and Supply Co.*

Hereby enters this disclaimer to claims 32 and 45 of said patent.

[*Official Gazette September 21, 1982.*]

Disclaimer 4,161,012.—*Francis V. Cunningham,* Western Springs, Ill. HIGH VOLTAGE PROTECTION APPARATUS. Patent dated July 10, 1979. Disclaimer filed Mar. 3, 1986, by the assignee, *Joslyn Corp.*

Hereby enters this disclaimer to claims 46 and 48 of said patent.

[*Official Gazette August 26, 1986.*]